Oct. 14, 1930. A. JOHNSON 1,778,217
FLEXIBLE CONNECTION AND CONNECTER FOR HIGH PRESSURE GREASE GUNS
Filed Nov. 15, 1926
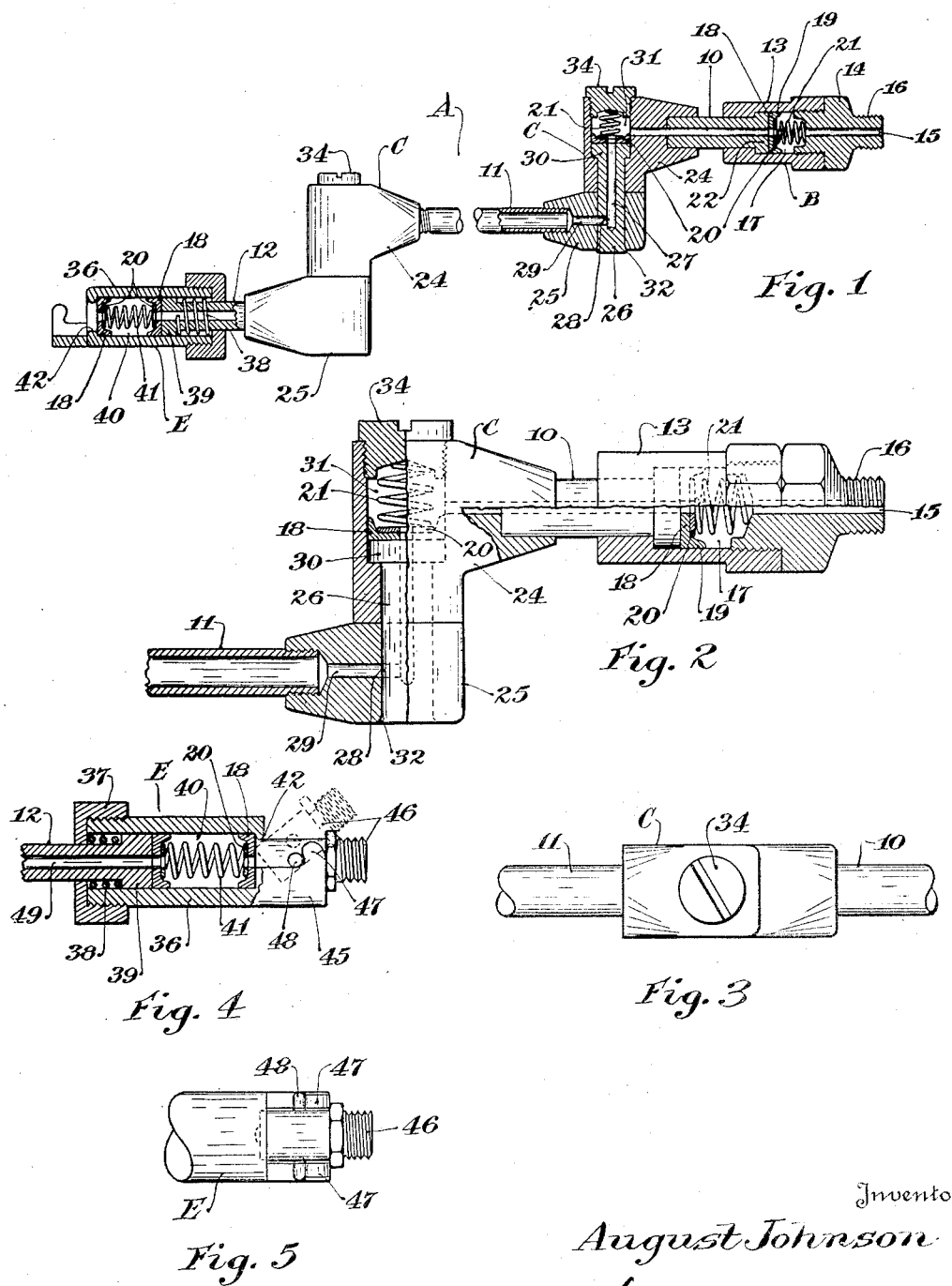
Inventor
August Johnson
By [signature]
Attorney Patented Oct. 14, 1930

1,778,217

UNITED STATES PATENT OFFICE

AUGUST JOHNSON, OF FARGO, NORTH DAKOTA, ASSIGNOR OF ONE-HALF TO ROBERT C. LEWIS, OF FARGO, NORTH DAKOTA

FLEXIBLE CONNECTION AND CONNECTER FOR HIGH-PRESSURE GREASE GUNS

Application filed November 15, 1926. Serial No. 148,355.

My invention relates to flexible connection and connecter for high pressure grease guns wherein it is designed to provide a tubular member with the flexible joints so that grease can be passed through the same under high pressure and without leakage at the joints yet providing a very simple and practical structure.

A feature of the invention resides in a pivoted joint member which is adapted to connect the double sections of the tubes of the flexible connection.

This joint is formed with a body portion in which a packing and swivel head is held in a manner to prevent leakage of grease through the joint between the two sections of the flexible connection. By a simple design the packing and resilient means for holding the same may be readily removed or replaced, thereby providing a structure which makes up a flexible connection of a very practical nature.

My invention is adapted to provide a particular means of packing wherein a non-metallic flexible washer-like member such as leather or other suitable packing material is adapted to be held compressed with its annular outer edge deflected up the sides of the chamber wherein the packing is held and by means of a metallic or head washer, a coil spring member is adapted to bear against the washer and packing to hold the same in place, while a plug member is screwed down against the spring member thereby providing a packing adapted to automatically draw tight by the increase of pressure in the chamber about the packing which is in a direction to force the packing into operative position, as the grease under pressure passes through the joint.

My invention includes a peculiar form of connecter for the attachment of the flexible connecter to the grease fitting. This connecter is designed to permit a quick attachment without the necessity of rotating the end parts, but merely by hooking the same on the grease fitting which can be done very quickly, a grease tight joint is provided.

These features together with other details and objects of my invention will be more fully and clearly set forth to fully describe the invention throughout the specification.

In the drawings forming part of this specification:

Figure 1 is a side view partly in section of my flexible connection and connecter for high pressure grease guns.

Figure 2 is an enlarged detail partly in section of my connection.

Figure 3 is a plan view of one of the flexible joints.

Figure 4 is a section of the connecter for the grease fitting having my particular quick hook attachment.

Figure 5 is a partial elevation of a grease fitting.

My drawings illustrate my flexible connection A which is made up of a series of tubular members 10, 11 and 12. While I have illustrated the three main tubular members in the connection it is obvious that any number of these tubular members can be connected together so as to provide the desired length to the flexible connection A. My connecter is particularly designed to provide means for connection between a high pressure grease gun or injector and a grease fitting such as are used on shackle bolts, bearings and other places where a grease fitting is employed for the purpose of permitting a connecter to be attached thereto while grease is forced under high pressure to a bearing.

My connection A includes a particular connector joint B which is provided with a swivel sleeve 13 into which the cap or plug portion 14 is threaded. The plug portion 14 is formed with a passageway 15 extending therethrough to permit grease to be forced through the same. By means of the threads 16 formed on the outer end of the plug 14 the same can be connected to a grease gun or container wherein grease is adapted to be forced through the passageway 15, said container or gun not being illustrated in the drawing.

The swivel collar 13 is adapted to provide a chamber 17 wherein I position a leather washer 18 having a central passageway therethrough and the annular outer sides 19 being adapted to extend up the side wall of the chamber 17. By means of a metallic washer 20 which is adapted to bear centrally upon the washer 18 urged by the coil spring 21, I provide a packing which is adapted to automatically seat itself more firmly as the pressure increases, thereby providing a tight joint between the enlarged portion 22 of the tube 10 and the inner surface of the chamber 17, forming a grease tight joint yet permitting the connecter B to be rotated.

The respective tubes 10, 11 and 12 of the connection are designed to be flexed or rotated by means of the joints C which connect the same. These joints are composed of members 24 and 25 which are pivotally held together by means of a connecter pin 26. This pin 26 is very much similar to the tube 10 with the enlarged head portion 22.

The pin 26 is formed with a central passageway 27 which does not extend entirely though the pin but which passageway is adapted to extend transversely out of the pin at 28 which connects with the passageway 29 extending out of the portion 25 in a manner to connect with the tubular member 11.

By means of the enlarged head 30 on the pin 26 which is adapted to engage in the chamber 31 formed in the member 24 the pin 26 is held in a manner to hold the members 24 and 25 pivotally connected together. The lower end of the pin may be upset at 32 to hold the pin in a manner to connect the members 24 and 25 and to rigidly secure the pin 26 in the member 25 in a manner so that it will not rotate therein to keep the passageway 28 alined with the passageway 29.

I provide a packing washer 18 of leather or other flexible material similar to the washer 18 in the chamber 17 and which is held in the same manner by the coil spring 21 excepting that the coil spring 21 is held by a closed plug 34 which is threaded into the top of the chamber 31. In this manner a self-adjusting packing is provided of a very simple nature yet having the necessary means of providing a packing to form a grease tight joint against the head 30 in the connection C. This permits the connection C to rotate, that is, the tubes 10, 11 and 12, so as to permit the flexing of the connection A.

The plugs 34 permit the easy and quick replacement of the packing washers 18 at any time if it is desired and may also be operated to tighten the spring members 21 so as to increase the pressure against the metal washers 20 which bear flatly against the leather washers 18. This holds the leather washers in operative position at all times.

My connection includes a novel grease fitting connecter E which is formed with a tubular member 36 illustrated clearly in Figure 4 and which is adapted to connect with the tubular member 12 by means of the collar 37. A coil spring 38 is interposed between the collar 37 and a head portion 39 formed on the inner end of the tubular member 12 and in this manner the head 39 is held under spring tension in a manner to bear against the leather washer 18 positioned in the chamber 40 of the connecter E. A coil spring 41 positioned in the chamber 40 is adapted to bear against the washer members 20 at either end of the chamber which in turn bear against the leather washers 18, one of which bears against the head 39 while the other is adapted to be pressed towards the shoulder 42 toward the outer end of the chamber 40 of the connecter E. The member 36 is formed with a hook end portion 45 which is formed of a semi-circular nature to provide a recess for receiving the grease fitting such as 46 and suitable hook ends 47 are provided on the sides of the member 45 which are adapted to engage the pins 48 projecting from each side of the grease fitting 46.

In Figure 4 I have illustrated the manner of hooking the grease fitting 46 into the hook ends 47 showing the grease fitting in dotted position and in full line position to show the fitting after it is in place bearing against the packing washer 18. As the fitting 46 is attached to the connecter E the bearing washer 18 on the outer side of the same is compressed against the spring 41 in a manner to form a grease tight joint between the grease fitting and the connecter E and thereby permitting grease to pass through the passageway 49 in the tubular member 12 through the chamber 40 and in through the grease fitting 46.

It will be noted that through all of the joints of my flexible connection I have provided a particular grease joint which is adapted to automatically seat itself and which is made up of the leather washers 18, the compressor plate washer 20, and the spring means 21 and 41 which is adapted to function very readily in providing a grease tight joint. I have tested my connecter very carefully and have found that it will hold a very high pressure of grease without leakage, yet permitting the joints to flex freely when desired.

This is important in an article of this nature as grease guns have been designed to give higher pressure than heretofore and it has been found that many joints require considerable pressure especially if they are tight and may require a very high pressure to force the grease into the bearings. Then it is also important that the flexible connection be quick to attach and disengage yet having a grease tight connection when it is attached.

In accordance with the patent statutes I have described the principles of operation of my invention together with the best embodiment thereof and I desire to have it understood that these drawings and illustrations are only suggestive of a means of carrying out my invention and that the same may be applied to uses other than those above set forth within the scope of the following claims.

I claim:

1. A flexible connection for high pressure grease guns including, a joint having two members pivotally connected together, a tubular pin for holding said members together, an enlarged head formed on one end of said pin, the other end thereof being fixed in one of said members, a packing washer adapted to bear against the head of said pin and covering the same, a plate member, and spring means on either side of said enlarged head for pressing said plate member against said packing washer whereby a pressure tight joint is provided for automatically seating the packing more firmly the higher the pressure passing through the joint.

2. A grease fitting connecter including, a swivel joint on one end, a packing washer adapted to fit against said swivel joint, a grease fitting connecter on the other end including a channel-shaped projecting end with hooks formed thereon and an opening on the side adjacent the hooks to receive the grease fitting, and a packing washer member adapted to bear automatically against the grease fitting when the same is hooked into said hook members.

AUGUST JOHNSON.